June 24, 1969

H. E. SPOONER ETAL 3,451,836

METHOD OF CONTINUOUSLY BONDING A NARROW SOLDER STRIPE
ON METAL STRIP MATERIAL

Filed Sept. 12, 1966

INVENTORS
Howard E. Spooner
Theodore A. Wozniak
BY

AGENT

United States Patent Office 3,451,836
Patented June 24, 1969

3,451,836
METHOD OF CONTINUOUSLY BONDING A NARROW SOLDER STRIPE ON METAL STRIP MATERIAL
Howard E. Spooner, Lincoln, and Theodore A. Wozniak, Barrington, R.I., assignors to Engelhard Industries, Inc., Newark, N.J., a corporation of Delaware
Filed Sept. 12, 1966, Ser. No. 578,627
Int. Cl. C23c *17/00, 1/12, 1/06*
U.S. Cl. 117—4                                      4 Claims The present invention deals with a method of bonding a narrow solder stripe on metal strip material and more particularly with a method of continuously bonding a thin and narrow solder stripe on and longitudinally of a wider metal strip material.

In the continuous bonding of a solder stripe to metal strip material where the accuracy of location, thickness and width of the solder stripe is of critical significance, e.g. when the composite strip is intended as a stock item for the manufacture of electrical components such as electrical contact arms, reed switches, etc., of uniform performance, there is the difficulty of controlling accuracy of location, thickness and width of the solder stripe. For example, the continuous bonding of the solder to the strip requires the solder at some stage to be in a molten condition to effect the bonding and as such with known control methods some variation in the width and thickness of the solder is unavoidable because of lateral solder flow. This condition is further aggravated when the solder is continuously applied while the metal strip is travelling at substantially high speeds.

The present invention relates to a method for continuously bonding a narrow solder stripe on metal strip material by providing a preformed solder stripe in the form of a thin ribbon or foil, controlling the application of flux to either the stripe or strip or to both, there being a particular relationship between the solder stripe and the flux, and critically controlling the bonding of the solder stripe to the metal strip material.

It is an object of the invention to provide a method for bonding a solder stripe to metal strip material whereby the initial location and width of the solder stripe on the strip is accurately maintained during the bonding and subsequent operations.

It is another object of the invention to provide a method for maintaining the accuracy of location and width of the solder stripe under high speed continuous bonding operations.

Figure 1:
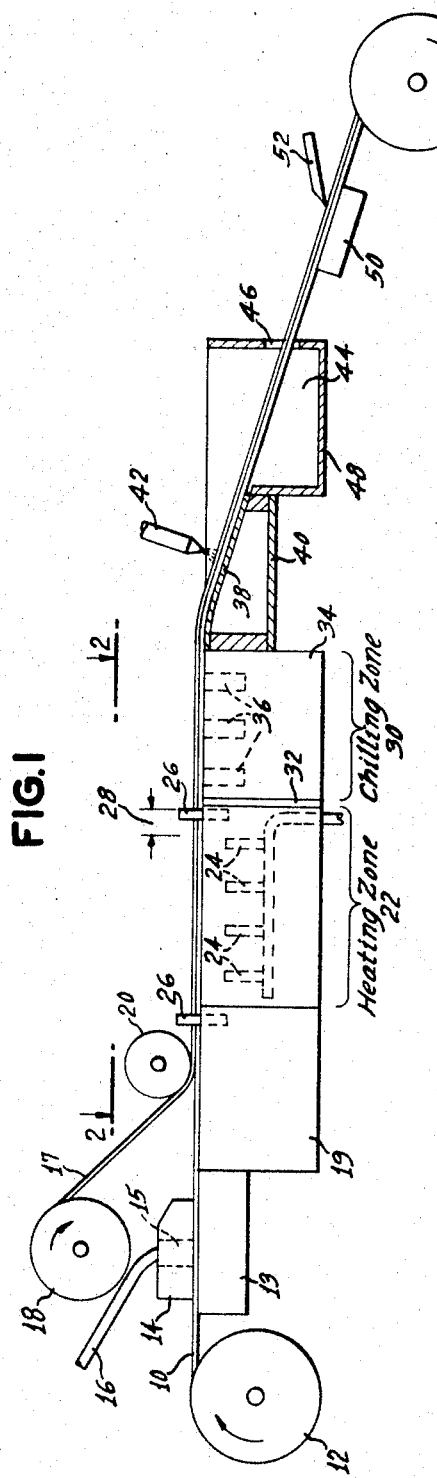
Figure 2:
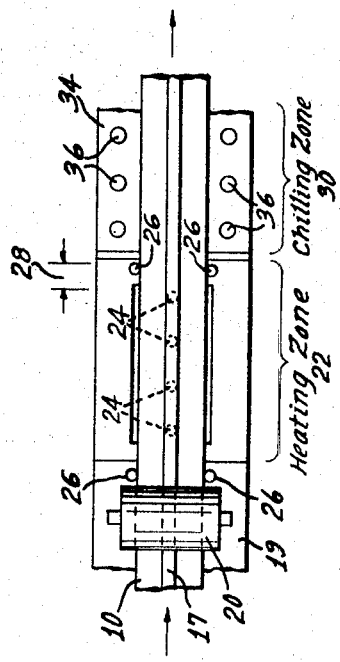

Other objects and advantages of the invention will become apparent from the description hereinafter following and the drawings forming a part herewith, in which:

FIGURE 1 illustrates a partly diagrammatic and partly cross-sectional side view of an apparatus for performing the method of the invention, and FIGURE 2 illustrates a top view along lines 2—2 of FIGURE 1.

In accordance with FIGURES 1 and 2 a metal strip 10 composed of a beryllium-copper alloy, brass, steel or other metals and alloys, and fed from a reel 12 over a base 13. A flux applicator 14 is mounted on the base 13 and contains a yieldable porous body 15, e.g. a felt pad, which is charged or soaked with liquid or semi-liquid flux preferably by means of metering tube 16 which meters flux to the porous body in a controlled amount so as not to over-saturate the porous body with the flux. A surface of the flux-charged porous body is urged into contact with the top surface of the strip 10 which is directed to pass between the applicator 14 and base 13. In passing over the base 13, the top surface of the strip 1 is wipe-wetted with the flux-charged porous body thereby moistening or wetting the strip surface with an optimum amount of the liquid flux. The wiping surface of the porous body is dimensioned to deposit flux over a longitudinally extending area that substantially corresponds with the width of the subsequently applied solder foil or ribbon. The term "wipe-wetted" is employed herein to indicate that the flux is applied as a thin film in an amount just sufficient to wet the metal strip surface without excess and thereby preventing any appreciable lateral flow of flux upon compression. A preformed solder stripe 17 composed, e.g., of a known tin-lead alloy, tin-silver alloy, lead antimony alloy, tin indium alloy, or a combination of lead antimony and tin indium alloys, however any solder that has a liquidus temperature below that of the base strip, e.g. a solder which would melt below 1300° F., in the form of ribbon or foil is fed from reel 18 and guidely superposed on and in alignment with the longitudinally extending wipe-wetted flux areas and both the solder stripe 17 and strip 10 are simultaneously passed and pressurized between base 19 and compression roll 20 forwardly of the base 13 under compression insufficient to dimensionally deform the solder stripe. The composite strip is passed through the compression stage and further stages by pulling it through such stages. Pulling the composite strip through the compression stage is essential since this permits the strip 10 to carry the thin solder stripe 17 without breakage or otherwise deforming the strip such as by rippling if the motivating force were applied by the compression roll 20. The solder stripe 17 is essentially a flexible thin ribbon or foil and as it is compressed to strip 10 by roll 20 any air or gas intermediate the stripe and strip is squeezed out and the stripe 17 adheres to the wipe-wetted area on the strip 10 by virtue of being wettable by the flux when under compression while also being readily surface to surface conformable with the wipe-wetted surface of the strip 10 by virtue of its flexibility and thinness of the order of about 0.0015″. The stripe would be wettable by the flux without compression if greater amounts of flux were employed, but then when applying compression for bonding purposes there would be an underisable uncontrollable lateral flow of flux. Also, if the thickness of the stripe were more than about 0.05″, the stripe would not be readily surface to surface conformable with the wipe-wetted surface under compression insufficient to dimensionally deform the solder stripe.

However, since there is a particular relationship between the solder stripe and the flux as indicated supra, the adherence of the stripe 17 to the strip 10 eliminates any necessity for any further subsequent compression of the stripe and strip which would be deleterious to the dimensional stability of the composite strip especially during the bonding operation.

Having adhered the stripe 17 and strip 10 to each other by means of roll 20, the composite strip passes through a heating zone 22. The heating zone 22 comprises a heating means 24 directed to heat the composite strip which is progressively heated through its passage througth the heating zone while the strip 10 is guided therethrough by means of guide pins 26.

In passing through the heating zone 22, the composite strip is so progressively heated, by controlling its speed of travel, that the solder stripe 17 does not melt until it reaches a short melting or liquidus zone 28 at the end of the heating zone 22. In the melting or liquidus zone the solder is maintained in molten condition for only a very short period of from about 0.01 second to about 2.0 seconds, or for a period during which it is still confined by its molten surface tension, whereafter it is immediately chilled by passage into chilling zone 30. The transition period from the liquidus to the solidus condition is essentially short, as indicated above, so that it precludes any possibility of lateral solder creep. In order to provide for the immediate transition from the liquidus to the solidus condition, the heating zone and the chilling zone are insulated from each other by a narrow insulating means such as insulating gasket 32. The chilling zone 30 is provided by chilling block 34 which is cooled by a coolant liquid admitted to cooling pockets 36 in the block 34 or a suitable heat exchanger.

Subsequent to the chilling zone, the composite chilled strip is further progressively cooled by passing through a progressive cooling stage. This is accomplished by passing the strip 10 over and in contact with a plate 38 which is advantageously composed of a conductive metal, e.g., aluminum, in contact with a cooling medium such as water contained by vessel 40. When the strip 10 passes over and in contact with plate 38, it is substantially rapidly cooled by conduction. Preferably, at the same time that the strip 10 is being cooled, a coolant liquid, by means of nozzle 42, is sprayed onto the chilled solder stripe 17 which further effects cooling of the composite strip while at the same time the coolant spray, e.g. water, washes away or clean rinses the surface of the composite strip from some of the incidental flux which may border the solder stripe. Thereafter, the cooled composite strip is passed into a bath 44, e.g., a water bath, where any remaining incidental flux is substantially completely dissolved and brushed off. The cooled and clean composite strip is then passed out of the bath 44 through a suitable opening 46 in the bath container 48 and through a skiving means 50 and 52 where the solder stripe 17 is skived to provide a controlled thickness of the stripe down to about 0.003" if so desired. Having thus provided a dimensionally accurate composite strip, the finished composite strip is rolled onto reel 54, which is power motivated to continuously pull the strip 10 from reel 12, the solder stripe 17 from reel 18, and the combined composite strip throughout the entire fabricating process.

By the fabrication method according to this invention, it is now possible to provide a preformed strip 10 having optimum operative electrical and physical characteristics which are not altered during the bonding of the solder stripe 17 to the strip 10 in the fabrication of the composite strip. Since the optimum operative electrical and physical characteristics are not altered, any number of electrical contact elements subsequently formed from the composite strip will have uniform response relative to each other. For example, since the solder is applied as a dimensionally accurate stripe, there will be no excess flow in the soldering of the contact elements to other electrical components to bridge the circuits to respective contact elements which may cause a circuit crossover and, otherwise, impair the required uniform gram loading of the contact elements especially when strip 10 is required to have spring characteristics. Also, since the bonding operation is adapted for substantially high-speed fabrication, the solder itself is not subject to heating above its melting temperature for any length of time which would cause any change in solder composition which would tend to necessitate higher soldering temperatures than that of the oringinally applied solder stripe and which could deleteriously effect other electrical components to which the contact element is to be soldered.

While the flux, as illustrated, is applied to a travelling surface of the strip 10, it may also be applied to the solder stripe instead of the strip 10 or, otherwise, the flux may be applied to both the strip 10 and stripe 17.

What is claimed is:
1. The method of continuously bonding a preformed flexible, narrow and thin solder stripe onto and longitudinally of a wider metal strip material, comprising the steps of continuously pulling the strip and stripe material toward each other, wipe-wetting at least one of the stripes and a narrow preselected longitudinal area of the strip having a width corresponding to that of the stripe with a liquid flux in an amount sufficient to wet but insufficient to cause any readily noticeable lateral flow of flux beyond the width of the stripe upon subsequent compression of the stripe to the strip material, superposing the solder stripe onto and longitudinally of the preselected longitudinal area of the strip, compressing the stripe onto the strip under the compression insufficient to dimensionally deform the solder stripe but sufficient to cause the stripe to adhere to the strip while pulling the combined stripe and strip, progressively heating the combined stripe and strip by pulling through a heating zone until the solder stripe melts at the end of the heating zone, maintaining the solder in its molten condition for only a short period during which it is still capable of lateral confinement solely by its molten surface tension, thereafter immediately chilling the solder to a solidus condition by pulling through a chilling zone, thereafter rinsing and cooling the combined stripe and strip by pulling the combined stripe and strip through a rinsing and cooling zone, thereafter passing by pulling the combined stripe and strip through a liquid bath and therein dissolving any incidental flux remaining on the strip, said pulling of the stripe and strip being continuous and uniform throughout the said steps.

2. The method according to claim 1, comprising skiving the solder stripe to reduce its thickness.

3. The method according to claim 1, wherein the initial thickness of the solder stripe is from about 0.0015" to about 0.05".

4. The method according to claim 1, comprising maintaining the solder stripe in a molten condition for a short period from about 0.01 second to about 2.0 seconds.

References Cited

UNITED STATES PATENTS

| | | | |
|---|---|---|---|
| 1,785,762 | 12/1930 | Bundy | 117—131 X |
| 2,691,208 | 10/1954 | Brennan | 117—22 X |
| 2,876,132 | 3/1959 | Worden et al. | 117—131 X |
| 2,895,845 | 7/1959 | Jones et al. | 117—8 |
| 2,970,933 | 2/1961 | Barera et al. | 117—131 X |
| 3,261,713 | 7/1966 | Groten | 117—212 |

ALFRED L. LEAVITT, *Primary Examiner.*

J. R. BATTEN, JR., *Assistant Examiner.*

U.S. Cl. X.R.

29—33, 502; 117—43, 50, 119.2, 119.4, 131, 212; 118—68, 69